US008744671B2

(12) United States Patent
Abousleiman et al.

(10) Patent No.: US 8,744,671 B2
(45) Date of Patent: Jun. 3, 2014

(54) SYSTEM AND METHOD FOR DETECTING UNINTENDED STIMULUS AT A VEHICLE PEDAL

(75) Inventors: Rami Abousleiman, Auburn Hills, MI (US); Feisel Weslati, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 288 days.

(21) Appl. No.: 13/400,901

(22) Filed: Feb. 21, 2012

(65) Prior Publication Data
US 2013/0218404 A1 Aug. 22, 2013

(51) Int. Cl.
*G06F 11/30* (2006.01)
(52) U.S. Cl.
USPC ........................................................ 701/34.4
(58) Field of Classification Search
None
See application file for complete search history.

(56) References Cited

U.S. PATENT DOCUMENTS

| 6,851,333 | B2* | 2/2005 | Apel et al. ....................... 74/513 |
| 7,376,248 | B2 | 5/2008 | Ertl et al. |
| 2001/0027367 | A1 | 10/2001 | Maruko et al. |
| 2003/0007072 | A1 | 1/2003 | Mattes et al. |
| 2003/0067215 | A1* | 4/2003 | Rieth et al. ....................... 303/20 |
| 2009/0259377 | A1* | 10/2009 | Anikin ............................. 701/70 |
| 2011/0172057 | A1 | 7/2011 | Shioura |
| 2011/0282545 | A1* | 11/2011 | Karatsinides ................... 701/36 |

* cited by examiner

*Primary Examiner* — Thomas Tarcza
*Assistant Examiner* — Adam Alharbi
(74) *Attorney, Agent, or Firm* — Ralph E. Smith

(57) ABSTRACT

A system and method for monitoring a vehicle pedal are disclosed. According to the present disclosure, the method comprises determining whether a stimulus has been detected at the vehicle pedal. When the stimulus has been detected, the method comprises receiving sensor data from a sensor system, the sensor data being indicative of a shape of the stimulus, and determining whether the shape of the stimulus corresponds to an unintended object based on the sensor data. When the shape of the stimulus corresponds to an unintended stimulus, the method comprises performing an unintended stimulus operation.

20 Claims, 5 Drawing Sheets

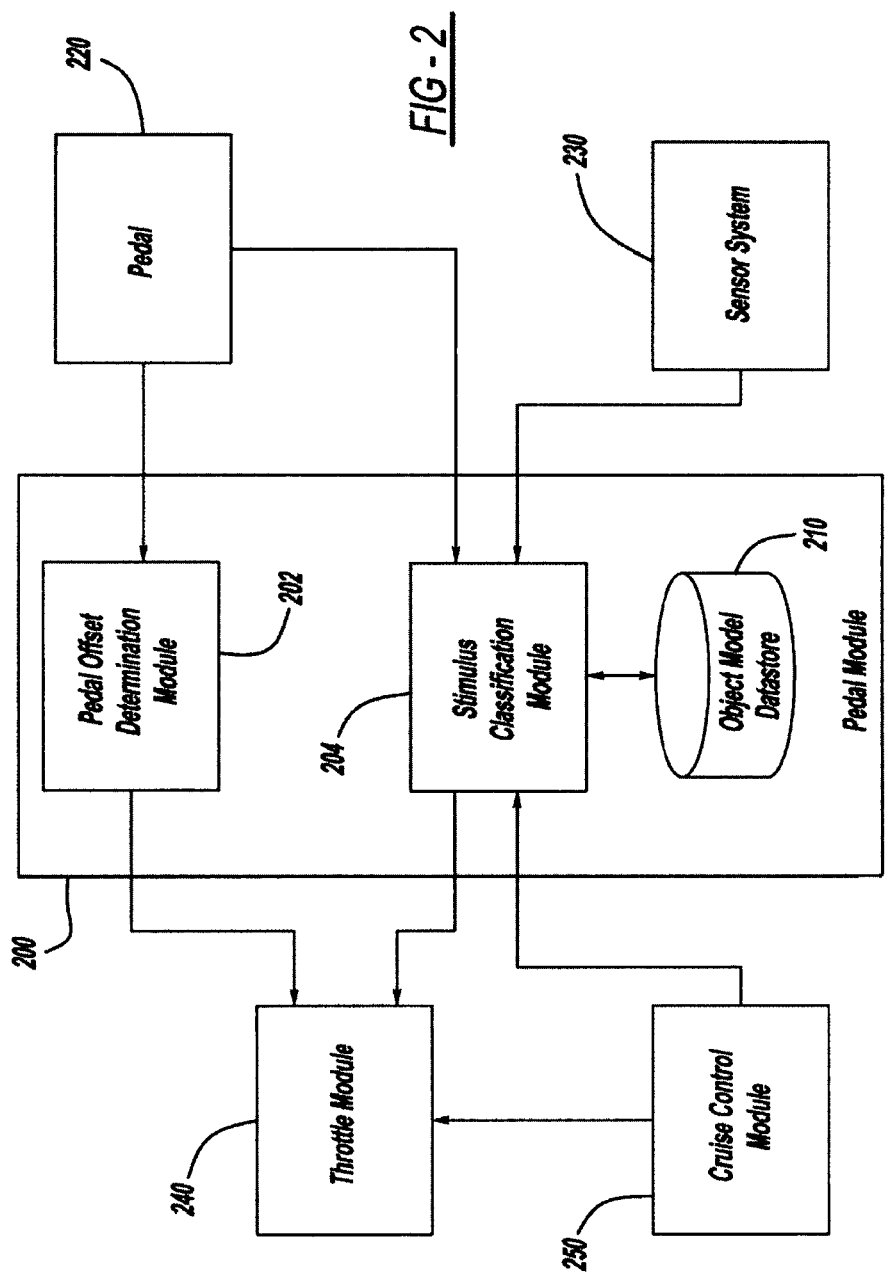

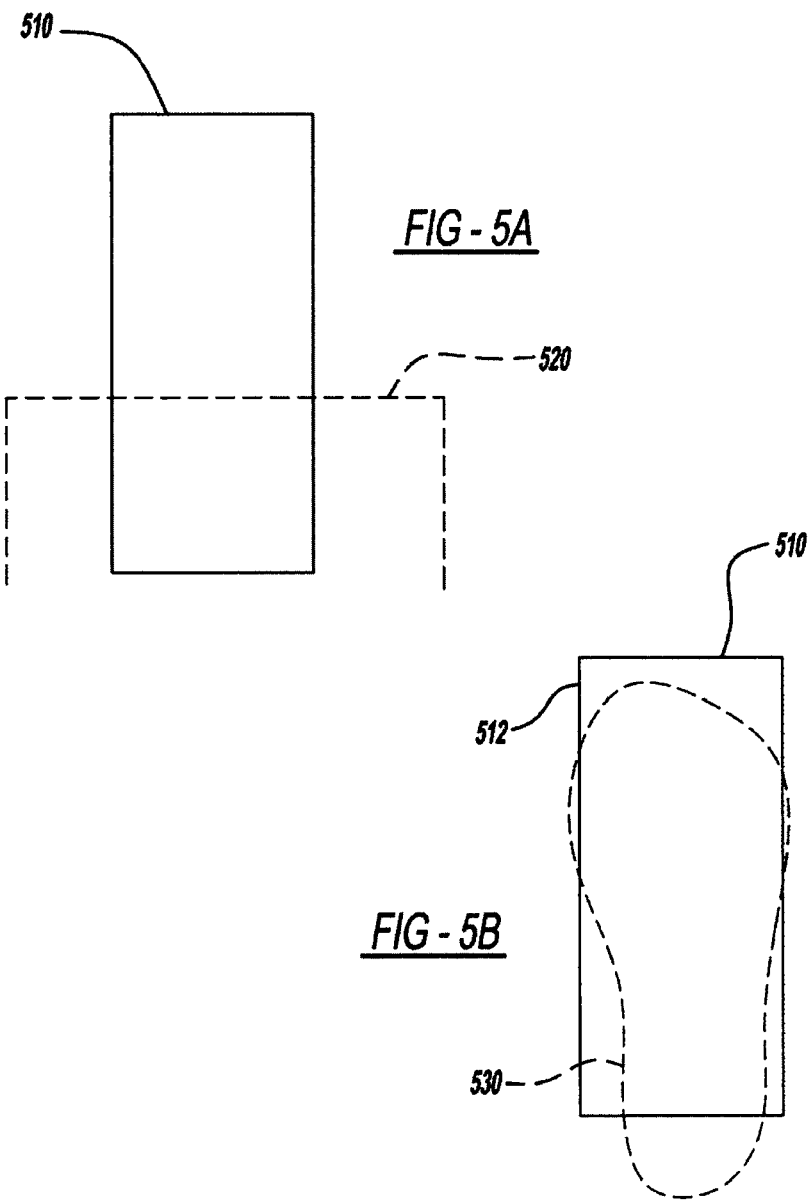

SYSTEM AND METHOD FOR DETECTING UNINTENDED STIMULUS AT A VEHICLE PEDAL

FIELD

The present disclosure relates to a system and method for determining an unintended stimulus at a vehicle pedal.

BACKGROUND

The acceleration and braking of a vehicle are typically controlled by foot pedals located in the foot well of the vehicle. In some scenarios, unintended objects such as the floor mat may become unintentionally engaged with one of the pedals, e.g., the accelerator pedal or brake pedal. In these scenarios, if the unintended object forcibly presses the foot pedal, the vehicle may unintentionally accelerate or brake, thereby creating an unintended situation for the driver of the vehicle and for those around the driver of the vehicle.

SUMMARY

In one aspect of the disclosure, a method for monitoring a vehicle pedal is disclosed, comprising determining whether a stimulus has been detected at the vehicle pedal. When the stimulus has been detected, the method comprises receiving sensor data from a sensor system, the sensor data being indicative of a shape of the stimulus, and determining whether the shape of the stimulus corresponds to an unintended object based on the sensor data. When the shape of the stimulus corresponds to an unintended stimulus, the method comprises performing an unintended stimulus operation.

In another aspect of the disclosure, the system comprises a vehicle pedal that controls a component of a vehicle, a sensor system that monitors the vehicle pedal, and a stimulus classification module. The stimulus detection module determines whether a stimulus has been detected at the vehicle pedal, and when the stimulus has been detected: i) receives sensor data from the sensor system, the sensor data being indicative of a shape of the stimulus, ii) determines whether the shape of the stimulus corresponds to an unintended object based on the sensor data, and iii) when the shape of the stimulus corresponds to an unintended object, performs an unintended stimulus operation.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a block diagram illustrating example components of a pedal module according to some embodiments of the present disclosure;

FIGS. 5A and 5B are drawings illustrating a top view of a pedal and a shape of a stimulus with respect to the pedal according to some embodiments of the present disclosure.

DETAILED DESCRIPTION

Figure 1:
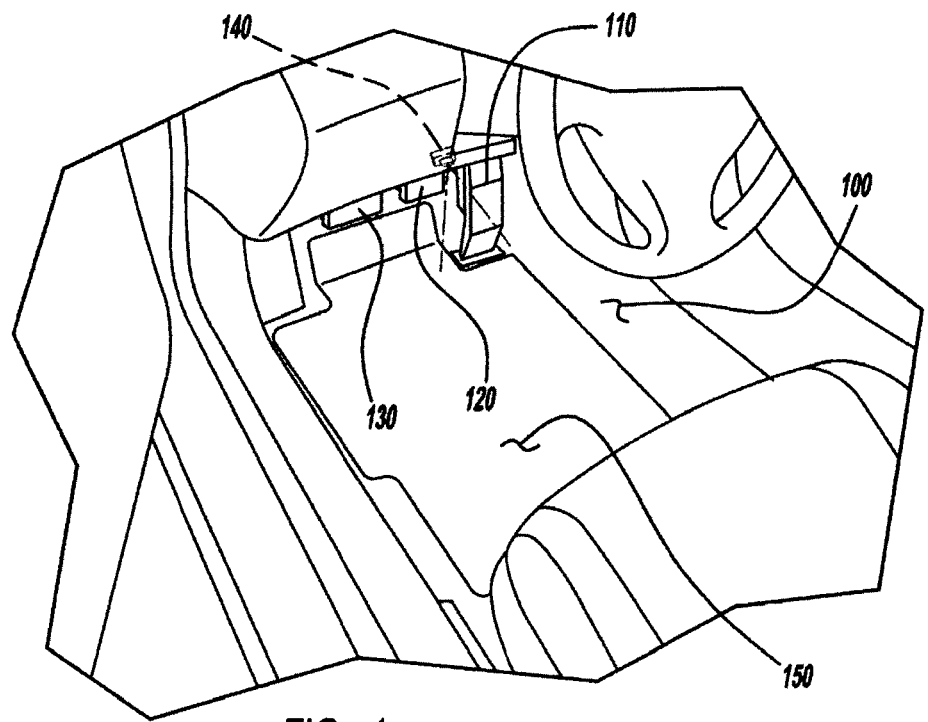
FIG. 1 is a drawing illustrating a perspective view of a foot well of a vehicle according to some embodiments of the present disclosure.

Referring now to FIG. 1, a top view of a foot well 100 of a vehicle is illustrated. The foot well 100 is the area of the vehicle where a set of vehicle foot pedals are located. The foot pedals can include an accelerator pedal 110 and a brake pedal 120. In some vehicles, the foot pedals may also include a clutch pedal 130. The foot well 100 may also include a floor mat 150. As described above, a situation may arise where the floor mat 150, or another unintended object, becomes engaged with one of the pedals, e.g., the accelerator pedal 110 or the brake pedal 120. A sensor system 140 such as a video camera or capacitive sensor array can be integrated into the foot well 100 to monitor the pedals, e.g., the accelerator pedal 110, the brake pedal 120, and/or the clutch pedal 130. The sensor system 140 provides sensor data indicative of a stimulus that has been detected at one of the pedals to a pedal module, which is discussed further below. Based on the sensor data, the shape of the stimulus can be classified as either an unintended object, e.g., the floor mat 150, or a intended object, e.g., a foot.

FIG. 2 illustrates an example pedal module 200 in communication with a pedal 220 and a sensor system 230. The pedal module 200 is configured to detect whether an unintended or intended stimulus has stimulated the pedal 220. For purposes of explanation only, the pedal 220 is described as an accelerator pedal. As the example pertains to an accelerator pedal, the pedal module 200 is illustrated as being in communication with a throttle module 240 and a cruise control module 250. It is appreciated that the techniques presented herein may be adapted to control a brake system or a transmission system as well. The pedal module 200 may include a pedal offset determination module 202, a stimulus classification module 204, and an object model datastore 210.

The pedal offset determination module 202 receives a signal, e.g., a voltage signal, from the pedal 220 indicating a position of the pedal 220 with respect to a rest position. The pedal offset determination module 202 can utilize the signal received from the pedal 220 to determine the offset of the pedal 220 from the rest position. For explanatory purposes, the amount of offset determined by the pedal offset determination module 202 can be referred to as an "offset value." As can be appreciated, when the pedal 220 is not engaged by a stimulus, the pedal 220 is in the rest position and the offset value is 0. It is appreciated that the offset value of the pedal 220 can be represented by a distance traveled, e.g., centimeters traveled from the rest position, or in an angular rotation about the fulcrum of the pedal 220, e.g., total radians from the rest position. Once engaged by a stimulus, the pedal offset determination module 202 can determine the offset value based on the received signal. The offset value can be provided to a system that is controlled by the pedal 220. For example, the offset value of the accelerator pedal 110 (FIG. 1) may be provided to a throttle module 240, which controls the acceleration of the vehicle. It is appreciated that the offset value of a brake pedal 120 (FIG. 1) could be provided to a brake system of the vehicle, and the offset value of a clutch pedal 130 (FIG. 1) could be provided to a transmission system of the vehicle.

The stimulus classification module 204 can be configured to receive sensor data from the sensor system 230. The stimulus classification module 204 can utilize the sensor data to capture a shape of a stimulus that has engaged the pedal 220. The stimulus classification module 204 can utilize the shape of the stimulus to classify the stimulus as corresponding to an unintended object or an intended object. If the stimulus corresponds to an unintended object, the stimulus classification module 204 can perform an unintended stimulus operation, or can cause an unintended stimulus operation to be performed by an associated component. Examples of unintended stimulus operations can include, but are not limited to, issuing a visual or audible notification to the driver of the vehicle, ignoring the signals resulting from the pedal 220 being engaged by the stimulus, and/or reducing the distance value outputted by the pedal offset determination module 202.

Figure 3A:
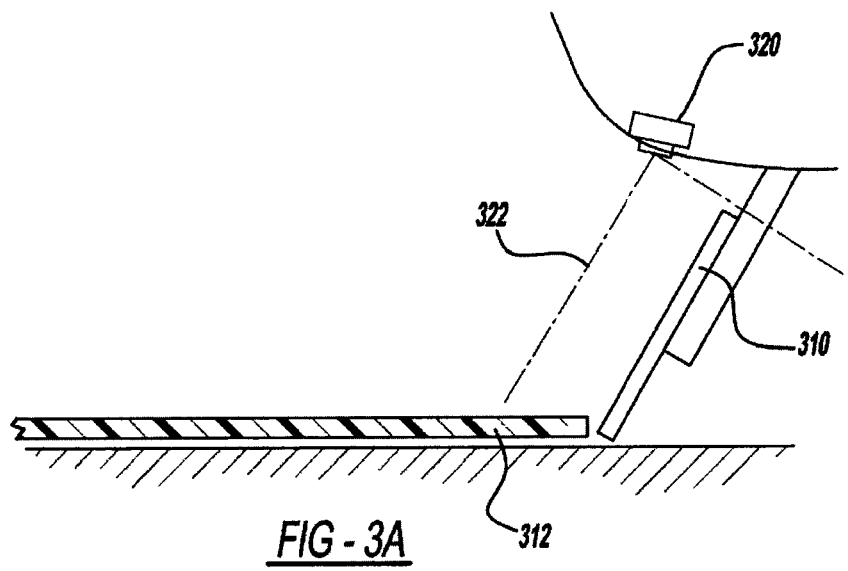
FIGS. 3A and 3B are drawings illustrating a side view of a pedal and a sensor system monitoring the pedal according to some embodiments of the present disclosure.
Figure 3B:
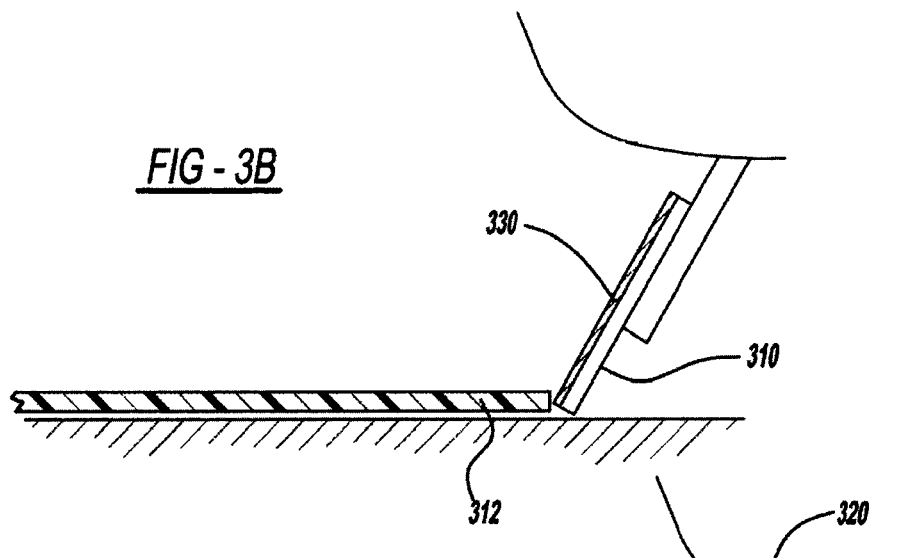

FIGS. 3A and 3B illustrate examples of sensor systems 230 that can communicate sensor data to the pedal module 200 (FIG. 2). In FIG. 3A, a side view of an example foot well is illustrated. In the example of FIG. 3A, the sensor system 230 includes a video camera 320 that is positioned to monitor one or more pedals 310. The video camera 320 may be positioned such that the video camera 320 has a field of view (FOV) 322 of one or more of the pedals in the foot well. For instance, the FOV 322 of the video camera 320 may include one or more of the brake pedal 120 (FIG. 1), the accelerator pedal 110 (FIG. 1), and the clutch pedal 130 (FIG. 1). For purposes of explanation, however, the FOV of the video camera 320 will be described as monitoring one pedal 310. The video camera 320 can be configured to output video data, such that the video data is indicative of the pedal 310 and any objects that also may be in the FOV 322 of the video camera 320. For example, the floor mat 312 may be captured in the FOV 322 of the video camera 320.

In FIG. 3B, a side view of an example foot well is illustrated. In the illustrated example, the sensor system 230 includes a capacitive sensor array 330 integrated across the surface of the pedal 310. The capacitive sensor array 330 outputs a signal indicative of the contact points between the stimulus and the pedal 310. It is appreciated that other contact sensitive sensors, e.g., piezoelectric sensors, can be used instead of capacitive sensors.

While FIGS. 3A and 3B illustrate a sensor system 230 having a video camera 320 or a capacitive sensor array 330, it is appreciated that any other type of sensor suitable for discerning a shape of the stimulus can be implemented. For instance, the sensor system 230 can include an infrared sensor, a sonar sensor, a temperature sensor, or any other suitable sensor.

Referring back to FIG. 2, the stimulus classification module 204 receives the sensor data from the sensor system 230 and classifies the type of stimulus based on the received sensor data. From the sensor data, the stimulus classification module 204 can determine the shape of the stimulus. For example, if the sensor system 230 includes a capacitive sensor array, the shape of the stimulus can be determined by the collection of activated contact points between the stimulus and the capacitive sensor array 330 (FIG. 3B). Similarly, when the sensor data is received from a video camera 320 (FIG. 3A), the stimulus classification module 204 can calculate a difference between an image when no stimulus is present and an image when the stimulus is present. The difference in images can represent the shape of the stimulus.

The stimulus classification module 204 classifies the stimulus based on the shape of the stimulus. The stimulus classification module 204 may implement any suitable pattern matching or pattern recognition technique to classify the stimulus. For instance, in some embodiments, the stimulus classification module 204 may compare the shape of the stimulus to a plurality of object models stored in the object model datastore 210. The object model datastore 210 can include object models of unintended objects and object models of intended objects. If the shape of the stimulus matches an object model of an unintended object, the stimulus can be classified as an unintended object. If the shape of the stimulus matches an object model of an intended object, the stimulus can be classified as an intended stimulus.

It is appreciated that the stimulus classification module 204 can be configured to classify the stimulus using other techniques as well. For example, the stimulus classification module 204 can implement edge detection processes, circle or sphere detection processes, and/or machine learning processes such as a neural network.

Figure 4A:
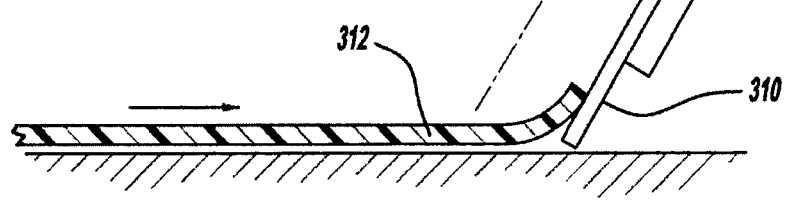
FIGS. 4A and 4B are drawings illustrating a side view of a pedal, a sensor system monitoring the pedal, and a stimulus according to some embodiments of the present disclosure.
Figure 4B:
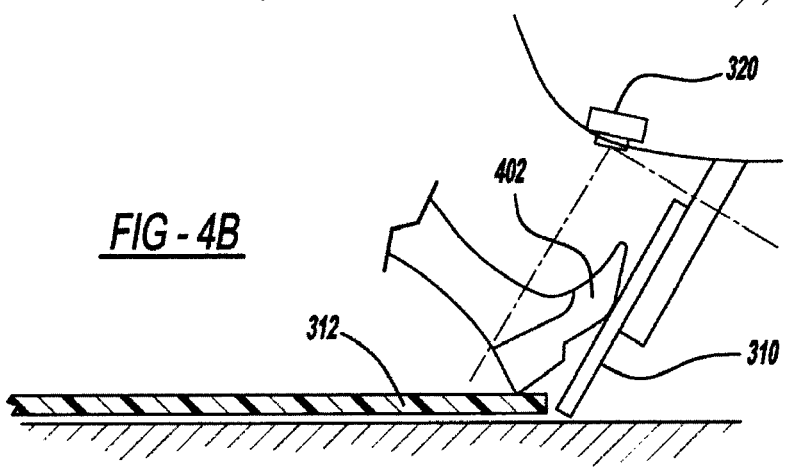

FIGS. 4A and 4B illustrate examples of unintended and intended stimuli, respectively, engaging the pedal 310. In FIG. 4A, the floor mat 312 has engaged the pedal 310. The video camera 320 captures an image of the floor mat 150 engaging the pedal 310 and provides the image to the stimulus classification module 204. In FIG. 4B, a foot 402 has engaged the pedal 310. The video camera 320 captures an image of the foot 402 engaging the pedal 310 and provides the image to the stimulus classification module 204. It is appreciated that any other type of sensor could also capture sensor data that is indicative of the shape of the stimulus. The video camera 320 is provided for example only.

In the examples of FIGS. 4A and 4B, the sensor data is provided to the stimulus classification module 204, which discerns the shape of the stimulus from the sensor data. For example, FIGS. 5A and 5B illustrate examples of different shapes of stimuli. In FIG. 5A, a stimulus 520 extends across the pedal 510 in a straight line. The stimulus classification module 204 can compare the determined shape of the stimulus 520 with the object models of the object model database 210 to classify the stimulus 520 as an unintended object, e.g., a floor mat.

In FIG. 5B, a stimulus 530 has a concave contour that extends down the left edge 512 of the pedal 510. Further, the top of the stimulus 530 has a convex contour. The stimulus classification module 204 can compare the determined shape of the stimulus 530 with the object models of the object model database 210 to classify the stimulus 530 as an intended object, e.g., a foot.

Referring back to FIG. 2, if the stimulus is classified as an intended object, the stimulus classification module 204 does not need to respond to the stimulus, e.g., the offset value output by the pedal offset determination module 202 is provided to the throttle module 240. If, however, the stimulus is classified as an unintended object, the stimulus classification module 204 can perform an unintended stimulus operation. For example, the unintended stimulus operation may include generating a visual or audible notification to the driver of the vehicle. In some embodiments, the stimulus classification module 204 can be configured to transmit a signal to the throttle module 240 indicating that an unintended stimulus has been detected. In these scenarios, the throttle module 240 may be configured to disregard the offset value provided by the pedal offset determination module 202, or to disregard the offset value when the offset value is greater than a predetermined number. For example, if an unintended stimulus is detected and the offset value indicates that the pedal 220 being fully engaged, e.g., "floored," the throttle module 240 may be configured to disregard the offset value and, thus, not accelerate the vehicle.

It is appreciated that some vehicles can drive in a "cruise control" mode. In these vehicles, the pedal module 200 may be further configured to communicate with a cruise control module 250. As can be appreciated, the cruise control module 250 regulates the acceleration of the vehicle to maintain a constant velocity. The cruise control module 250 allows a driver to release the accelerator pedal 110 (FIG. 1) and maintain the velocity of the vehicle. The stimulus classification module 204 can determine the cruise control status from the cruise control module 250. If the vehicle is in a cruise control mode, then the set of unintended stimulus operations can be adjusted. For example, if cruise control is on and an unintended stimulus is detected, then any offset signal may be disregarded. Similarly, if an intended stimulus is detected, offset values up to a predetermined threshold can be disregarded.

It is appreciated that the stimulus classification module 204 can be further configured to verify the offset value output by the pedal offset determination module 202. For example, if the offset value outputted by the pedal offset determination module 202 has a value greater than 0, but the sensor data outputted by the sensor system 230 does not indicate stimulus at the pedal, then the stimulus classification module 204 can provide an indication to the throttle module 240 that the offset value may be incorrect. Similarly, if the sensor system 230 includes a video camera, the distance traveled by the pedal 220 can be verified from the video data. For example, if the pedal offset determination module 202 determines that the pedal 220 has been offset by $\pi/12$ radians by an intended stimulus, the stimulus classification module 204 can verify the offset value by comparing an image of the engaged pedal 220 with an object model corresponding to a pedal being engaged by approximately $\pi/12$ radians. It is appreciated that the foregoing can be used to verify the output of the pedal offset determination module 202.

Figure 6:
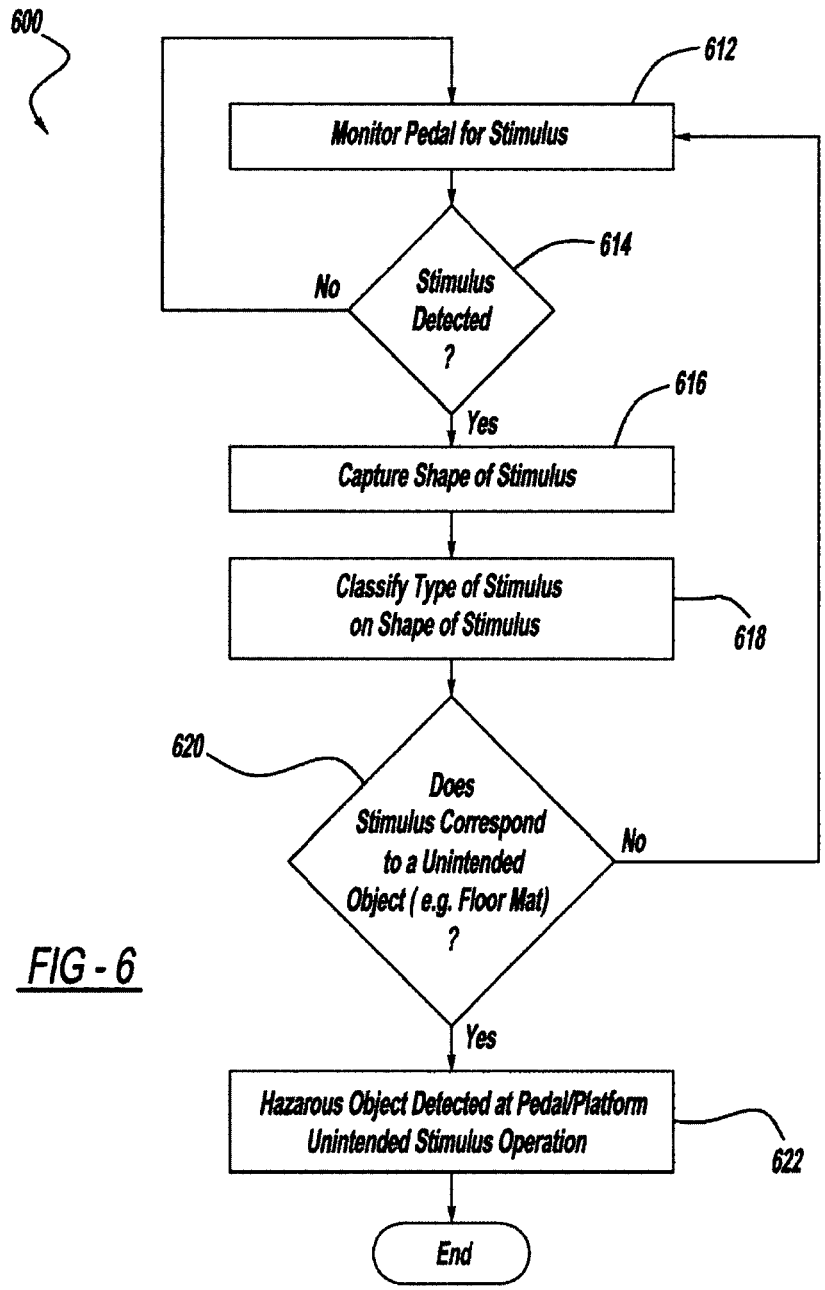
FIG. 6 is a flow chart illustrating an example method for monitoring a pedal according to some embodiments of the present disclosure.

Referring now to FIG. 6, an exemplary method 600 for monitoring a pedal 220 is depicted. At step 612, the stimulus classification module 204 monitors the pedal 220 to determine whether a stimulus has engaged the pedal. To make this determination, the stimulus classification module 204 can monitor the sensor data received from the sensor system 230, can receive the signal outputted by the pedal 220, or can receive a signal from the pedal offset determination module 202 indicating that the offset value is greater than 0. The stimulus classification module 204 can wait until a stimulus is detected, as illustrated by steps 612 and 614, prior to classifying the stimulus.

Once a stimulus is detected, the stimulus classification module 204 can capture a shape of the stimulus, as shown at step 616. The shape of the stimulus can be captured from the sensor data. As described above, if the sensor system 230 includes a video camera, the shape can be determined by, for example, determining a difference between an image with the stimulus and an image without the stimulus. If the sensor system 230 includes a capacitive sensor array, the shape can be determined by, for example, locating all of the contact points between the stimulus and the pedal 220.

At step 618, the stimulus classification module 204 can classify the stimulus based on the shape of the stimulus. In some embodiments, the stimulus classification module 204 compares the captured shape with object models stored in the object model datastore 210 to determine which of the object models matches to the captured shape of the stimulus. It is appreciated that any other suitable pattern matching or pattern classification techniques can be used to classify the captured shape.

Once the shape of the stimulus has been classified, the stimulus classification module 204 determines whether the shape of the stimulus corresponds to an unintended object or an intended object. In some embodiments, the object models can be classified as unintended or intended. In these embodiments, the stimulus classification module 204 can characterize the shape of the stimulus as corresponding to an unintended object or intended object based on the object model that the shape of the stimulus most closely matched.

If the shape of the stimulus corresponds to an unintended object, then the stimulus classification module 204 can perform an unintended stimulus operation, as shown at 620. For example, the stimulus classification module 204 can cause an audio or visual notification to be provided to the driver, or the stimulus classification module 204 can provide an unintended stimulus signal to the system controlled by the pedal 220. For example, the stimulus classification module 204 can send a signal to the throttle, brake, or transmission indicating that an unintended stimulus has been detected. If the stimulus does not correspond to an unintended object, the method 600 can continue to execute.

It is appreciated that the foregoing method 600 is provided for example and not intended to be limiting. The steps described above can be performed in multiple substeps, or may be combined into single steps. Variations of the method 600 are also contemplated and within the scope of the disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, bytecode and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for monitoring a vehicle pedal comprising:
   determining whether a stimulus has been detected at the vehicle pedal;
   when the stimulus has been detected:
      receiving sensor data from a sensor system, the sensor data being indicative of a shape of the stimulus;
      determining whether the shape of the stimulus corresponds to an unintended object based on the sensor data; and
      when the shape of the stimulus corresponds to an unintended stimulus, performing an unintended stimulus operation.

2. The method of claim 1, wherein determining whether the shape of the stimulus corresponds to the unintended object comprises matching the shape of the stimulus to one of a plurality of object models, the plurality of models representing different objects, the different objects including one or more unintended objects.

3. The method of claim 2, wherein the plurality of models include at least one model representing a foot and at least one model representing a floor mat.

4. The method of claim 3, wherein when the shape of the stimulus corresponds to a floor mat, performing the unintended stimulus operation.

5. The method of claim 1 wherein the sensor system includes a video camera and the sensor data is a video stream.

6. The method of claim 1 wherein the sensor system is a capacitive sensor array integrated on a surface of the pedal, and the sensor data is indicative of points of contact between the stimulus and the capacitive sensor array.

7. The method of claim 1 wherein the vehicle pedal is an accelerator pedal.

8. The method of claim 7 further comprising receiving an offset value indicative of a distance traversed by the pedal from a rest position, the offset value being utilized to determine an acceleration of the vehicle.

9. The method of claim 8 wherein when the shape of the stimulus corresponds to an intended object, determining an acceleration value to provide to a throttle module based on the offset value, and providing the acceleration value to the throttle module.

10. The method of claim 8, wherein the unintended stimulus operation includes at least one of:
    generating an alert indicating detection of the unintended object;
    reducing an acceleration value that is determined from the offset value; and
    ignoring the offset value.

11. A system comprising:
    a vehicle pedal that controls a component of a vehicle;
    a sensor system that monitors the vehicle pedal,
    a stimulus classification module that determines whether a stimulus has been detected at the vehicle pedal, and when the stimulus has been detected:
       i) receives sensor data from the sensor system, the sensor data being indicative of a shape of the stimulus,
       ii) determines whether the shape of the stimulus corresponds to an unintended object based on the sensor data, and
       iii) when the shape of the stimulus corresponds to an unintended object, performs an unintended stimulus operation.

12. The system of claim 11 further comprising:
    a data object datastore that stores a plurality of object models, the plurality of object models representing different objects, the different objects including one or more unintended objects,
    wherein the stimulus classification module determines whether the shape of the stimulus corresponds to an unintended object comprises by matching the shape of the stimulus to one of the plurality of data object models.

13. The system of claim 12, wherein the plurality of object models at least include at first object model representing a foot and a second object model representing a floor mat.

14. The system of claim 13, wherein when the shape of the stimulus corresponds to the second object model, the stimulus classification module performs the unintended stimulus operation.

15. The system of claim 11 wherein the sensor system includes a video camera and the sensor data is a video stream.

16. The system of claim 11 wherein the sensor system is a capacitive sensor array integrated on a surface of the pedal, and the sensor data is indicative of points of contact between the stimulus and the capacitive sensor array.

17. The system of claim 11 wherein the vehicle pedal is an accelerator pedal.

18. The system of claim 17 further comprising a pedal offset determination module that receives a signal from the pedal indicating a position of the vehicle pedal with respect to a rest position and determines an offset value of the pedal based the position of the vehicle pedal, the offset value being utilized to determine an acceleration of the vehicle.

19. The system of claim 18 further comprising:
    a throttle module that controls a throttle of the vehicle,
    wherein when the shape of the stimulus corresponds to an intended object, determining an acceleration value to provide to the throttle module based on the offset value, and providing the acceleration value to the throttle module.

20. The system of claim 18, wherein the unintended stimulus operation includes at least one of:
    generating an alert indicating detection of the unintended object;
    reducing an acceleration value that is determined from the offset value; and
    ignoring the offset value.

* * * * *